United States Patent Office.

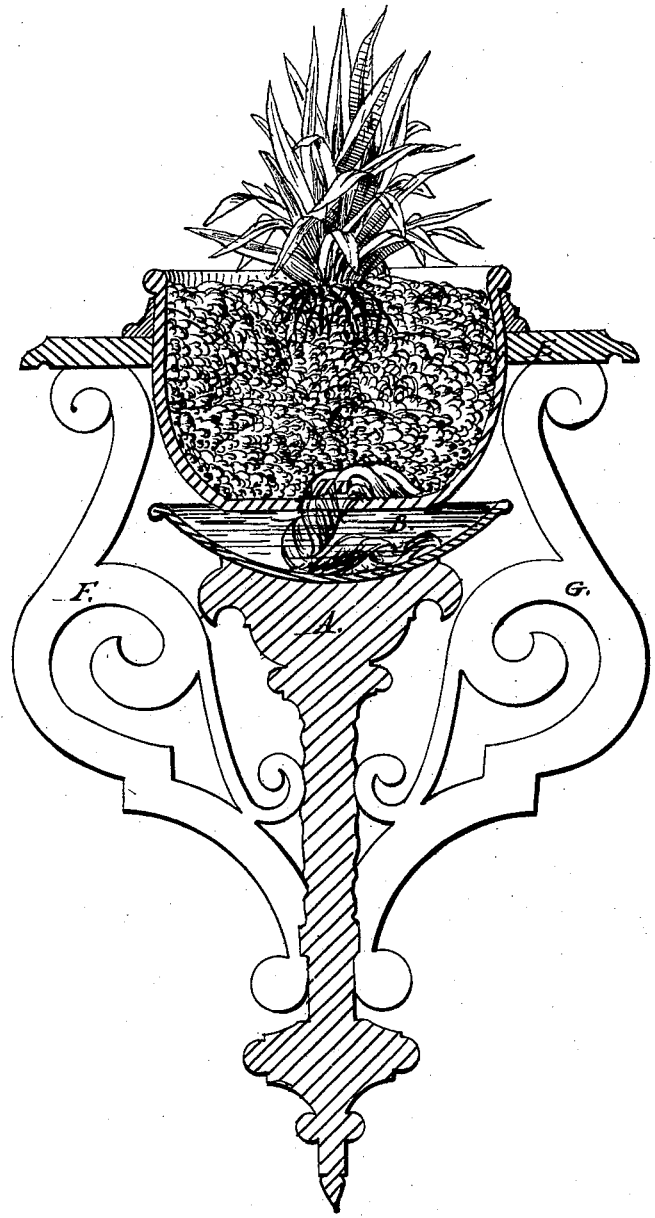

CHARLES L. STEELE, OF BOSTON, MASSACHUSETTS.

*Letters Patent No. 107,558, dated September 20, 1870.*

IMPROVEMENT IN FLOWER-POTS.

The Schedule referred to in these Letters Patent and making part of the same.

Know all men by these presents that I, CHARLES L. STEELE, of Boston, in the county of Suffolk and State of Massachusetts, have invented a new and useful Improvement in Flower-Pots, of which the following description with accompanying drawing is an accurate specification.

The drawing is a vertical section of the device as adapted to a hanging basket.

The nature of the invention consists in placing the flower-pot over a detached pan of water, and so supporting the pot and the water-pan that the bottom of the flower-pot may be above the surface of water in the pan, and in passing capillary threads through the drainage-hole of the flower-pot, and spreading them about within the pot at the bottom of the earth, while the other end dips into the water.

In the drawing—

Standard A, brackets F and G, and rim E form the hanging basket.

Upon standard A is placed the water-pan B, and rim E supports the flower-pot C. The bottom of the flower-pot must be above the level of the water in pan B, and through a hole in the bottom of pot C is passed a bundle of capillary threads, D, such as lamp wicking, which are distributed about among the earth in the pot C, and descend through said hole into the water in water-pan B.

Upon watering the plant as usual upon the top of the earth, the water will descend into the pan B, which thus thoroughly drains the flower-pot, and afterward, so long as there is any water in pan B, it is constantly and gradually supplied to the roots of the plants by the capillary threads D.

By this device a healthy and nearly uniform supply of water is presented directly to the roots of the plants, the necessity for using large and deep flower-pots half filled with pot-sherds is avoided, the plants never suffer from imperfect drainage, or from having their roots soaking in the damp earth of the bottom of the flower-pot, and the hanging basket may be made of ornamental wood-work, with glass flower-pot and water-pan, and be made more tasteful, cleanly, and elegant than at present.

If desired to use the pot and pan without the hanging basket, take a flat saucer for the water-pan B, and place in it a perforated block or tile, through which the capillary threads may descend to the bottom of the water-pan, and support the flower-pot C upon this block, so that the bottom of the pot may be above the water-level.

I claim as my invention—

In a flower-pot, C, the bottom of which is permanently adjusted above the level of the water in water-pan B, the arrangement of capillary threads D, passing through the hole in the bottom of pot C and dipping into the water in pan B, for the purpose of constantly and regularly supplying water to the requirements of the roots of plants in said pot, substantially as described.

CHARLES L. STEELE.

Witnesses:
    THOS. WM. CLARKE,
    ASA LYON.